Oct. 19, 1937.　　　　　G. L. LEE　　　　　2,096,284
GLASS CUTTING APPARATUS
Filed April 22, 1936
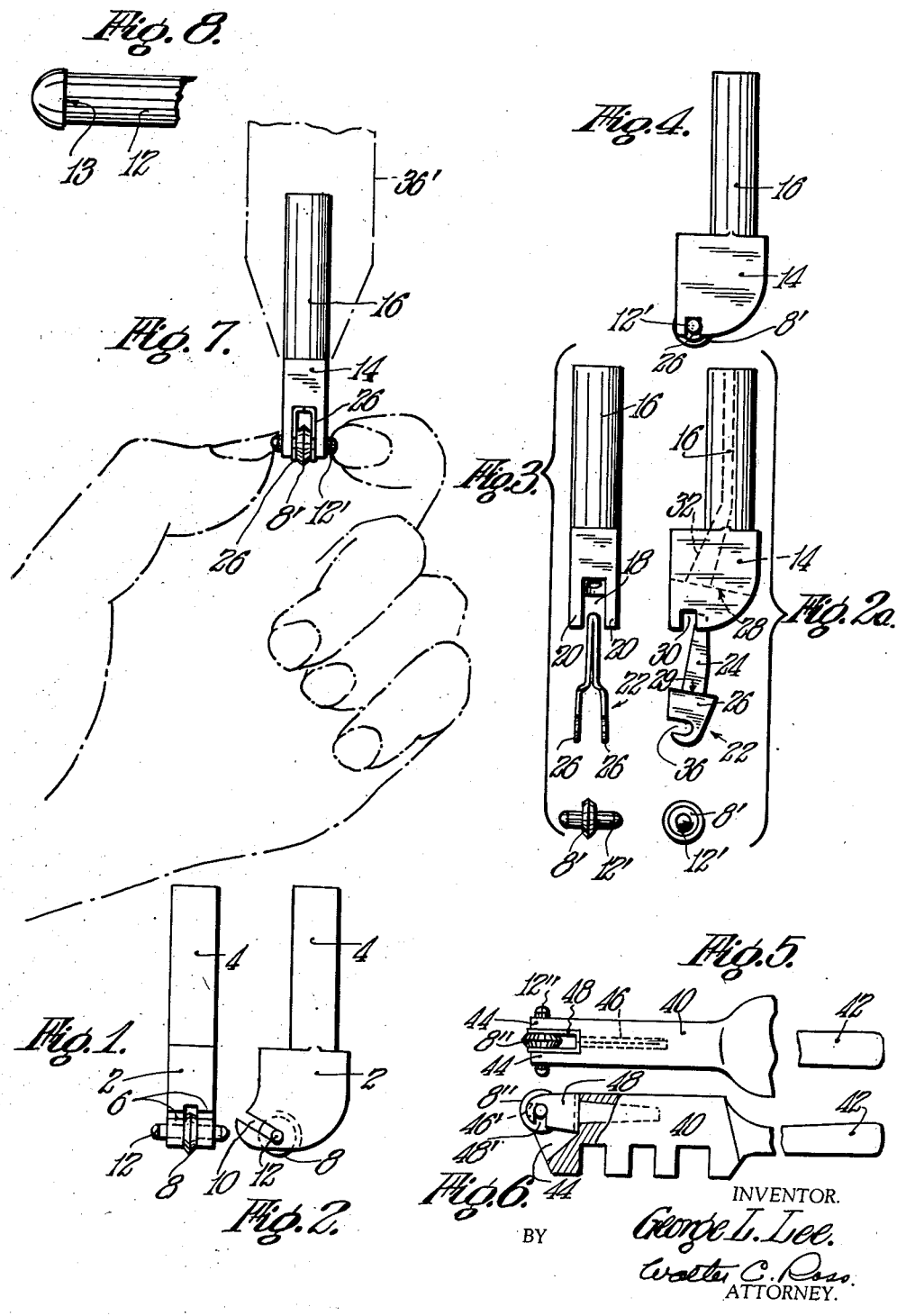
INVENTOR.
George L. Lee.
BY Walter C. Ross
ATTORNEY.

Patented Oct. 19, 1937

2,096,284

UNITED STATES PATENT OFFICE 2,096,284

GLASS CUTTING APPARATUS

George L. Lee, Maplewood, N. J., assignor to Landon P. Smith, Inc., Irvington, N. J., a corporation of New Jersey Application April 22, 1936, Serial No. 75,770

9 Claims. (Cl. 49—52)

This invention relates to improvements in glass-cutting apparatus and is directed more particularly to glass-cutting apparatus involving a removable glass-cutting wheel.

One object of this invention is the provision in a glass-cutting apparatus of a removable wheel and as a specific novel feature of the invention the wheel and axle as a unit are readily removable without the aid of special tools. This novel object is accomplished in one way by the provision of a wheel axle which is of such a length that its opposite ends project beyond the head or post which carries the wheel and axle to facilitate the ends of the axle being engaged between the fingers and the unit withdrawn from the head or post thereby.

In glass-cutting apparatus with removable wheel and axles heretofore known, it has been difficult to remove the wheels and in many instances it is necessary to resort to tools to effect removal of the wheel from the part which supports it. In connection with glass-cutting machines, as distinguished from glass cutters which are held in and manipulated by the hand, a holder or post carries the wheel which is removed from the machine when the wheel is to be changed. This is not only inconvenient but requires time and slows up production.

According to this invention, the wheel and its axle may be readily removed from the part which holds it without removing the part from the machine. Thus by obviating the necessity of removing the wheel carrier from the machine, the machine is not stopped for any great length of time and production is not interfered with.

The novel features of the invention may take various forms without departing from the spirit and scope thereof and therefore the following description is to be taken as a disclosure rather than as a limitation as to the scope of the invention.

In the drawing:

Figs. 1 and 2 are front and side elevational views of a glass-cutting apparatus embodying the novel features of the invention;

Fig. 2a is a side elevational view of disassembled parts to explain certain novel features of the invention;

Fig. 3 is an end elevational view of the parts shown in Fig. 2;

Fig. 4 is a side elevational view showing the parts of Figs. 2a and 3 in assembled relation;

Figs. 5 and 6 are plan and side elevational views of the novel features of the invention associated with a head of a glass cutter;

Fig. 7 is an end elevational view of the cutter apparatus shown in Fig. 4 to explain how the wheel and its axle may be removed from the part which carries the head and axle; and Fig. 8 is a partial front elevational view on a large scale of the axle shown in Fig. 1.

Referring now to the drawing more in detail the invention will be fully described.

In Figs. 1 and 2 there is shown a carrier 2 for a glass-cutting wheel which may be called a head or post. This may have a stem of a shape as indicated by 4 and adapted to be held by a part of a glass-cutting machine or the like. The lower part of the head is cut away or slotted as shown to provide spaced cheeks indicated by 6. The slot therebetween is for receiving a glass-cutting wheel indicated by 8.

The cheeks 6 are provided with an axle-slot 10 which is adapted to receive an axle 12 for the wheel. Preferably the slot 10 is angularly disposed, as shown, so that in ordinary course, the unit will not tend to fall from the post.

According to the invention, the axle ends project beyond the outer sides of the parts which support it, such as the cheeks 6. This is to facilitate the ready and easy removal of the axle and wheel from its carrier by means of the fingers.

For instance, the ends of the axle may be embraced between the thumb and forefinger of the hand and the axle and wheel withdrawn from the slot as shown in Fig. 7. By thus making it possible to readily and easily remove the wheel and axle, special tools are unnecessary and it is unnecessary to remove the carrier from the machine in which it is used. Thereby a saving in time is effected, since the machine need not be stopped for any great length of time and the carrier or post is not disturbed.

It is desirable that the wheel 8 and axle 12 be more or less of a unit. To this end, I preferably provide means to prevent accidental separation of wheel and axle and this may take the form of a flange or flanges 13 on the axle, as on the end thereof (see Fig. 8). Thus, the unitary device may be readily removed as above described without danger of loss of either wheel or axle which commonly are quite small and more or less difficult to handle.

In Figs. 2a, 3, 4, and 7, a carrier in the form of a post 14 is provided which has a shank or stem 16. This shank or stem 16 may be of any form desired and adapted to be receivable in that part of a machine which usually receives a glass-cutter head or post. The head 14 at its lower end is slotted at 18 to provide spaced cheeks 20.

A retainer 22 is provided which is formed of spring-like material and has a stem or shank 24 and spaced cheeks 26 between which cheeks a glass-cutter wheel 8' is receivable. The wheel has an axle 12'. The bottom of the slot 18 is formed as indicated at 28 to receive shoulders 29 of the retainer member and there is a socket 32 in the post or head 14 which receives the stem or shank 24 of the retainer.

Notches or open-ended slots 30 are provided in the marginal edges of the cheeks 20 of the post or head 14, while notches or open-ended slots 36 are also provided in the cheeks 26 of the retainer. The parts are formed to fit properly and in assembling the parts the axle 12' is disposed in the slots 36 of the retainer with the wheel 8' between the cheeks 26 thereof.

The retainer 22 is slipped into slot 18 of the head or post 14 by inserting the shank or stem 24 in the socket 32, with the cheeks 26 of the retainer bearing against the inner sides of the cheeks 20 of the head or post 14. As stated, the retainer is preferably made from some more or less spring-like material and it is formed so that when it is in the post the cheeks 26 thereof yieldingly bear against the cheeks of the said post.

It is to be noted the parts are so formed that when assembled as described and shown in Figs. 4 and 7, the slots 36 in the retainer and the slots 30 in the post, and in which the axle is seated, are disposed angularly relative to one another. In this way, the axle 12' is confined on all of its sides so that it will not be displaced accidentally from the head or post while the ends of the axle project beyond the sides of the post as is desired.

The carrier 14 may be placed in the glass-cutting machine which has a part indicated by dot-dash lines 36' for holding the said post as shown in Fig. 7. When it is desired to remove the axle and wheel, it is only necessary to engage the ends of the axle between the fingers of the hand, as for instance between the thumb and first finger as indicated by dot-dash lines, and without removing the post, the axle and wheel are simply pulled downwardly, thus removing the wheel, axle and retainer. Then another retainer, axle and wheel may be inserted in the post or another wheel or axle may be inserted in the retainer which may be readily inserted in the post.

From the foregoing it will be readily appreciated that it is possible to very quickly and easily remove the wheel and axle without the aid of any special tools or in fact any tools at all and it is unnecessary to remove the post from its support or part which carries it.

It has been difficult hereto to remove the wheels and often a special tool of some kind has been necessary and the post has been removed from the machine. All of this is now unnecessary.

In Figs. 5 and 6 there is shown a head or carrier member 40 of a hand glass-cutter which has a handle or grip represented by 42. This head 40 is slotted to provide cheeks 44 similar to the forms of the invention previously described.

A retainer member, similar to that previously described, has a stem or shank 46 which fits in a suitable socket provided in the head and it has spaced cheeks 48 adapted to receive therebetween a wheel 8". The cheeks 44 are provided with notches or open ended slots 46' which correspond to the slots 30 shown in Fig. 2a while the cheeks 48 of the retainer are provided with slots 48' similar to the slots 36 of the retainer 22 in Fig. 2a.

As in the former case the retainer is preferably made from spring-like material and is so formed that the cheeks 48 thereof yieldingly bear against the inner faces of the cheeks 44 of the head. As shown in Fig. 5 the axle is sufficiently long so that its opposite ends project beyond the sides of the head 40 wherefore said axle may have its opposite ends engageable between the fingers of the hand to facilitate the ready and easy removal of the wheel and axle from the head. As has been stated, it is difficult, if not impossible, to remove the wheels from glass cutters having so-called removable wheels without the aid of tools or the like, but according to this invention the axle is readily and easily engaged to facilitate the quick removal thereof.

From the foregoing it will be observed that by reason of the axle's being so formed that its ends project beyond its carrier, it is easily removed or inserted by simply engaging the same between the fingers of the hand, thus obviating the necessity of special tools and overcoming the delays and inconvenience common with present day apparatus of the type to which the invention relates.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. The combination in glass cutting apparatus of, a carrier member having spaced cheeks, a cutter-wheel-retainer having spaced cheeks, certain of said cheeks provided with slots therein, a cutting wheel receivable between the cheeks of the retainer, and an axle for said wheel receivable in said slots of a length sufficient to have its ends extend beyond the cheeks of the carrier member when the retainer cheeks are between the cheeks of the carrier member to facilitate grasping of the ends of the axle between the fingers to effect removal or insertion of the wheel and axle from or in the carrier member.

2. The combination in glass cutting apparatus of, a carrier member having spaced cheeks, a cutter-wheel-retainer having spaced cheeks, certain of said cheeks provided with slots therein, a cutting wheel receivable between the cheeks of the retainer, and an axle for said wheel receivable in said slots of a length sufficient to have its ends extend beyond the cheeks of the carrier member when the retainer cheeks are between the cheeks of the carrier member to facilitate grasping of the ends of the axle between the fingers to effect removal or insertion of the wheel and axle from or in the carrier member, the cheeks of the retainer being relatively yieldable to yieldingly bear on the cheeks of the carrier member.

3. The combination in glass-cutting apparatus of, a carrier having spaced cheeks, a cutter wheel retainer having spaced cheeks receivable between the cheeks of the carrier, the cheeks of the carrier and of the retainer having slots extending inwardly from their edges with the slots of the carrier cheeks extending angularly relative to those of the retainer cheeks, a cutting wheel receivable between the cheeks of the retainer, and an axle for said wheel receivable in said slots.

4. The combination in glass-cutting apparatus of, a carrier member having spaced cheeks, a cutter wheel retainer having spaced cheeks receivable between the cheeks of the carrier member, a wheel receivable between the cheeks of the retainer, and an axle for said wheel, each of the cheeks of the retainer having an open-ended slot extending inwardly from an edge thereof, the said axle being receivable in said slots to hold the wheel axle and retainer in assembled relation and the cheeks of the carrier member having open-ended slots extending inwardly from edges thereof, all adapted and arranged whereby the retainer, wheel and axle may be assembled with the carrier member with the axle in the slots of the carrier member cheeks.

5. The combination in glass-cutting apparatus of, a carrier having spaced cheeks, a cutter wheel retainer having spaced cheeks receivable between the cheeks of the carrier, a wheel receivable between the cheeks of the retainer, and an axle for said wheel, each of the cheeks of the retainer having an open-ended slot extending inwardly from an edge thereof, the said axle being receivable in said slots to hold the wheel axle and retainer in assembled relation and the cheeks of the carrier having open-ended slots extending inwardly from edges thereof, the slots of the carrier cheeks being angularly disposed relative to the slots of the retainer cheeks whereby when the parts are assembled the open ends of the slots of the carrier cheeks are closed by the cheeks of the retainer and the open ends of the slots of the retainer cheeks are closed by the cheeks of the carrier, all adapted and arranged whereby the retainer, wheel and axle may be assembled with the carrier with the axle in the slots of the carrier cheeks.

6. The combination in glass-cutting apparatus of, a carrier having spaced cheeks, a wheel retainer having spaced cheeks receivable between the cheeks of the carrier, a wheel receivable between the cheeks of the retainer, an axle for said wheel, the cheeks of the retainer having open-ended slots extending inwardly from an edge thereof, the said axle being receivable therein to hold the wheel axle and retainer in assembled relation, the cheeks of the carrier having open-ended slots extending inwardly from an edge thereof, the slots of the carrier cheeks being angularly disposed relative to the slots of the retainer cheeks whereby when the parts are assembled the open ends of the slots of the carrier cheeks are closed by the cheeks of the retainer and the open ends of the slots of the retainer cheeks are closed by the cheeks of the carrier, the ends of the axle extending beyond the cheeks of the carrier cheeks a sufficient distance to be gripped between the fingers and facilitate removal of the retainer, wheel and axle from the post, all adapted and arranged whereby the retainer, wheel and axle may be assembled with the post with the axle in the slots of the post cheeks.

7. The combination in glass cutting apparatus of, a carrier having spaced cheeks, a wheel retainer having spaced cheeks receivable between the cheeks of the carrier, a wheel receivable between the cheeks of the retainer, an axle for said wheel, the cheeks of the retainer having open-ended slots extending inwardly from an edge thereof, the said axle being receivable therein to hold the wheel axle and retainer in assembled relation, the cheeks of the carrier having open-ended slots extending inwardly from an edge thereof, the cheeks of the retainer being relatively yieldable to yieldingly bear on the cheeks of the carrier, all adapted and arranged whereby the retainer, wheel and axle may be assembled with the carrier with the axle in the slots of the carrier cheeks.

8. The combination in glass cutting apparatus of, a carrier having spaced cheeks, a wheel retainer having spaced cheeks receivable between the cheeks of the carrier, a wheel receivable between the cheeks of the retainer, an axle for said wheel, the cheeks of the retainer having open-ended slots extending inwardly from an edge thereof, the said axle being receivable therein to hold the wheel axle and retainer in assembled relation, the cheeks of the carrier having open-ended slots extending inwardly from an edge thereof, the cheeks of the retainer being relatively yieldable to yieldingly bear on the cheeks of the carrier, the carrier being provided with a socket and the said retainer being provided with a tail-piece insertable in said socket, all adapted and arranged whereby the retainer, wheel and axle may be assembled with the carrier with the axle in the slots of the carrier cheeks.

9. The combination in glass cutting apparatus of, a carrier member having spaced cheeks which are provided with aligned open-ended axle slots therein, and a removable cutter-wheel assembly asociated with said carrier member including a glass cutting wheel and a substantially straight rod-like axle, said axle being removably disposed in said slots with the cutting wheel rotatably disposed between said cheeks of the carrier member and the said axle being of greater length than the distance between the outermost faces of the cheeks of the carrier so that the ends of the axle extend slightly therebeyond whereby the opposite ends of the axle may be grasped between the fingers of the hand to effect removal from or insertion of the assembly laterally in open ends of the slots of the carrier member.

GEORGE L. LEE.